(12) United States Patent
Swanson (10) Patent No.: US 10,471,658 B2
(45) Date of Patent: Nov. 12, 2019

(54) SHEET SUBSTRATE RETENTION DEVICE FOR SECURING A SHEET SUBSTRATE TO A VACUUM PLATEN IN AN ADDITIVE MANUFACTURING SYSTEM

(71) Applicant: Stratasys, Inc., Eden Prairie, MN (US)

(72) Inventor: William J. Swanson, St. Paul, MN (US)

(73) Assignee: STRATASYS, INC., Eden Prairie, MN (US)

( * ) Notice: Subject to any disclaimer, the term of this patent is extended or adjusted under 35 U.S.C. 154(b) by 689 days.

(21) Appl. No.: 15/131,823

(22) Filed: Apr. 18, 2016

(65) Prior Publication Data

US 2017/0297320 A1 Oct. 19, 2017

(51) Int. Cl.
| | |
|---|---|
| *B29C 64/245* | (2017.01) |
| *B29C 64/40* | (2017.01) |
| *B29C 64/106* | (2017.01) |
| *B29C 64/30* | (2017.01) |
| *B29C 64/20* | (2017.01) |
| *B29C 64/118* | (2017.01) |
| *B29C 64/223* | (2017.01) |
| *G03G 15/16* | (2006.01) |
| *G03G 15/22* | (2006.01) |
| *B33Y 10/00* | (2015.01) |
| *B33Y 30/00* | (2015.01) |

(52) U.S. Cl.
CPC .......... *B29C 64/245* (2017.08); *B29C 64/106* (2017.08); *B29C 64/118* (2017.08); *B29C 64/20* (2017.08); *B29C 64/223* (2017.08); *B29C 64/30* (2017.08); *B29C 64/40* (2017.08); *G03G 15/1625* (2013.01); *G03G 15/224* (2013.01); *B33Y 10/00* (2014.12); *B33Y 30/00* (2014.12)

(58) Field of Classification Search
CPC ........ B29C 64/20; B29C 64/245; B29C 64/30
See application file for complete search history.

(56) References Cited

U.S. PATENT DOCUMENTS

| | | |
|---|---|---|
| 8,403,658 B2 | 3/2013 | Swanson |
| 8,647,102 B2 | 2/2014 | Swanson et al. |
| 8,985,497 B2 | 3/2015 | Mannella et al. |
| 9,073,263 B2 | 7/2015 | Mannella et al. |
| 9,108,360 B2 | 8/2015 | Comb et al. |
| 2014/0178585 A1* | 6/2014 | Swanson ................ B29C 64/20 427/256 |

* cited by examiner

*Primary Examiner* — Timothy Kennedy
(74) *Attorney, Agent, or Firm* — Westman, Champlin & Koehler, P.A.

(57) ABSTRACT

An additive manufacturing system for forming 3D parts includes a platen, a gantry, at least one print head, and a retention device. The gantry is configured to move the platen along a vertical axis. The at least one print head is configured to extrude part and/or support material onto a sheet substrate that is positioned on a support surface of the platen. The retention device includes a frame that is configured to press two or more edge portions of the sheet substrate against the support surface of the platen when the retention device is in a lowered position relative to the platen or support surface.

20 Claims, 8 Drawing Sheets

FIG. 14

SHEET SUBSTRATE RETENTION DEVICE FOR SECURING A SHEET SUBSTRATE TO A VACUUM PLATEN IN AN ADDITIVE MANUFACTURING SYSTEM

BACKGROUND

The present disclosure relates to additive manufacturing systems for printing three-dimensional (3D) parts and support structures. In particular, the present disclosure relates to materials for use in additive manufacturing systems, consumable assemblies retaining the materials, and methods of manufacturing and using the materials and assemblies in additive manufacturing systems to print articles.

Additive manufacturing systems are used to print or otherwise build printed parts from digital representations of the printed parts (e.g., AMF and STL format files) using one or more additive manufacturing techniques. Examples of commercially available additive manufacturing techniques include extrusion-based techniques, jetting, selective laser sintering, high speed sintering, powder/binder jetting, electron-beam melting, and stereolithographic processes. For each of these techniques, the digital representation of the printed part is initially sliced into multiple horizontal layers. For each sliced layer, a tool path is then generated, which provides instructions for the particular additive manufacturing system to print the given layer.

Additive manufacturing is generally a process in which a three-dimensional (3D) object is manufactured utilizing a computer model of the objects. The basic operation of an additive manufacturing system consists of slicing a three-dimensional computer model into thin cross sections, translating the result into two-dimensional position data, and feeding the data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In a fused deposition modeling additive manufacturing system, a printed part may be printed from a digital representation of the printed part in a layer-by-layer manner by extruding a flowable part material along toolpaths. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

The 3D part may be fabricated on a polymeric sheet substrate releasably adhered to a build platen. The polymeric sheet substrate acts as a foundation or base on which to begin extrusion of material. The fabrication environment may be heated to delay solidification of the extruded part material. As is described in Comb et al., U.S. Pat. No. 5,939,008, vacuum pressure may be applied between the polymeric sheet substrate and the build platen to secure the sheet to the platen. However, heat-induced deformation of the sheet substrate (e.g., curling) caused by uneven heating of the sheet substrate, may prevent a vacuum from forming between the platen and the sheet, thus preventing secure retention of the sheet substrate on the build platen, until the sheet substrate flattens.

SUMMARY

Embodiments of the present disclosure are directed to an additive manufacturing system for forming 3D parts that includes a retention device for retaining a sheet substrate during the printing or forming of 3D parts, and a method of forming a 3D part using the additive manufacturing system. One embodiment of the system includes a platen, a gantry, at least one print head, and a retention device. The gantry is configured to move the platen along a vertical axis. The at least one print head is configured to extrude part and/or support material onto a sheet substrate that is positioned on a support surface of the platen. The retention device includes a frame that is configured to press two or more edge portions of the sheet substrate against the support surface of the platen when the retention device is in a lowered position relative to the platen or support surface.

In one embodiment of the method of forming a 3D part, a sheet substrate is retained on a support surface of a platen using a retention device. In one embodiment, this involves pressing two or more edge portions of the sheet substrate against the support surface using a frame of the retention device. A vacuum is applied to the support surface. A 3D part is then formed on the sheet substrate by extruding part and/or support material onto the sheet substrate using at least one print head.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

In the following detailed description, reference is made to specific exemplary embodiments by way of drawings and illustrations. These exemplary embodiments are described in sufficient detail to enable those skilled in the art to practice what is described, and serve to illustrate how elements of this disclosure may be applied to various purposes or embodiments. Other embodiments exist, and logical, mechanical, electrical, and other changes may be made.

Features or limitations of various embodiments described herein, however important to the embodiments in which they are incorporated, do not limit other embodiments, and any reference to the elements, operation, and application of the embodiments serve only to define these embodiments. Features or elements shown in various embodiments described herein can be combined in ways other than shown in the embodiments, and any such combinations is explicitly contemplated to be within the scope of the embodiments presented here. The following detailed description does not, therefore, limit the scope of what is claimed.

The present disclosure is directed to a retention device for use in an extrusion-based additive manufacturing system to print or form 3D parts in a layer-by-layer manner using an additive manufacturing technique. As discussed below, the retention device improves alignment and retention of a sheet substrate, such as a polymeric sheet, to a build platen onto which a 3D part and associated support structures are built. The disclosed retention device prevents curling and misalignment of the sheet substrate as the substrate is heated in a chamber of the additive manufacturing system, allowing for faster preparation of the sheet substrate for the 3D part printing process. The disclosed retention device thereby improves ease of use of the system and decreases the preparation time required prior to beginning the printing process.

Figure 1:
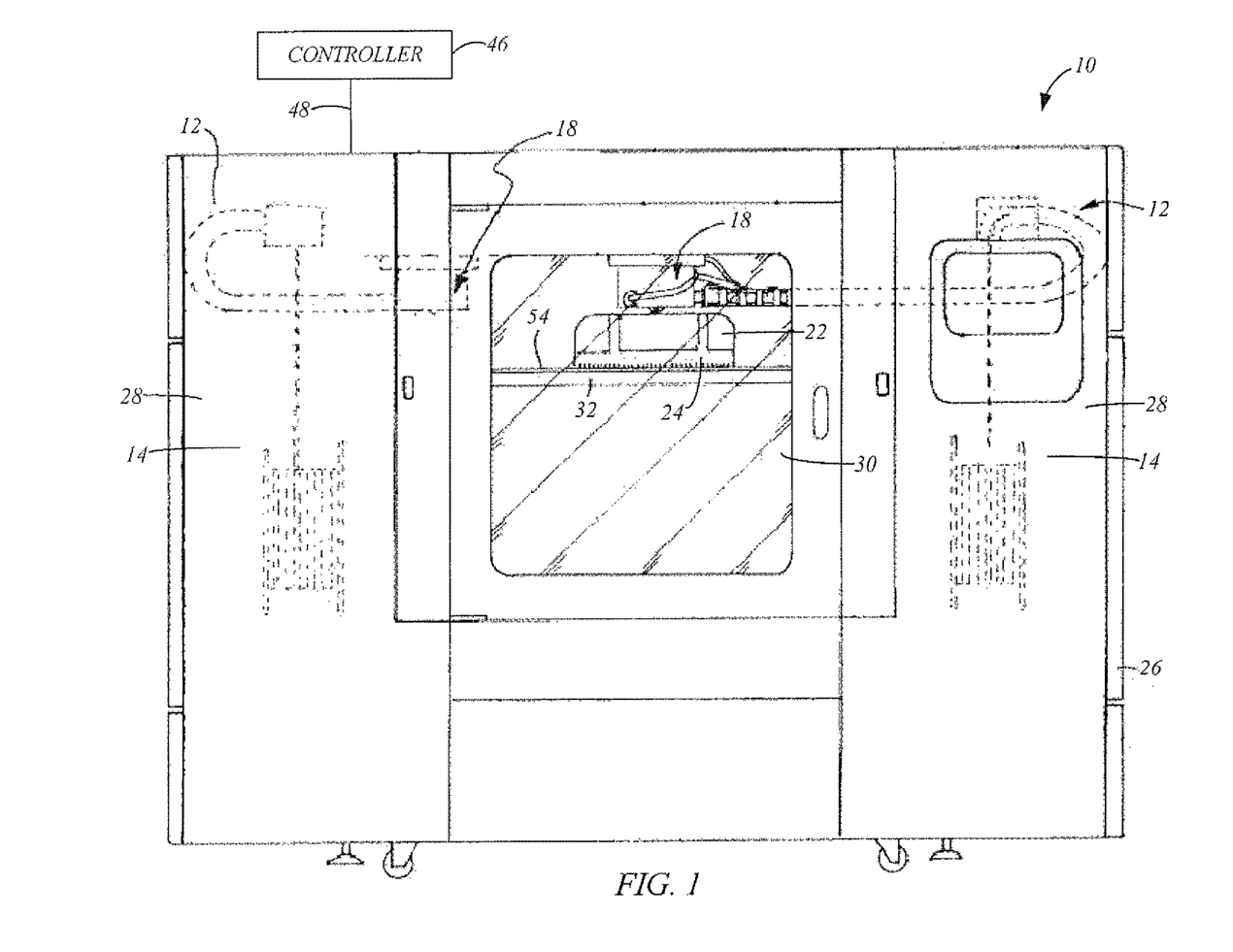
FIG. 1 is a front elevation view of an exemplary extrusion-based additive manufacturing system, in accordance with embodiments of the present disclosure.

FIG. 1 is a top, front perspective view of an exemplary extrusion-based additive manufacturing system 10, with which a retention device in accordance with embodiments of the present disclosure may be used. In some embodiments, system 10 uses exemplary extrusion assemblies 12, which may comprise an easily loadable, removable, and replaceable container device that retains a supply of a consumable material for printing with system 10. Typically, one of the extrusion assemblies 12 dispenses a part material filament ("part material consumable assembly"), and the other consumable assembly 12 dispenses a support material filament ("support material consumable assembly"). However, both extrusion assemblies 12 may be identical in structure or may have any other structure that will dispense or extrude consumable materials in patterns for printing 3D objects, and the consumable materials may be provided in forms other than filaments, such as pellets, slugs, liquid or gel, for example.

In the shown embodiment, each extrusion assembly 12 includes container portions 14 and print heads 18. Each container portion 14 may retain the consumable material, such as described in Mannella et al., U.S. Pat. Nos. 9,073,263 and 8,985,497, for example. A drive mechanism of each print head 18 is configured to draw successive segments or portions of the consumable material from the corresponding container portion 14.

Figure 2:
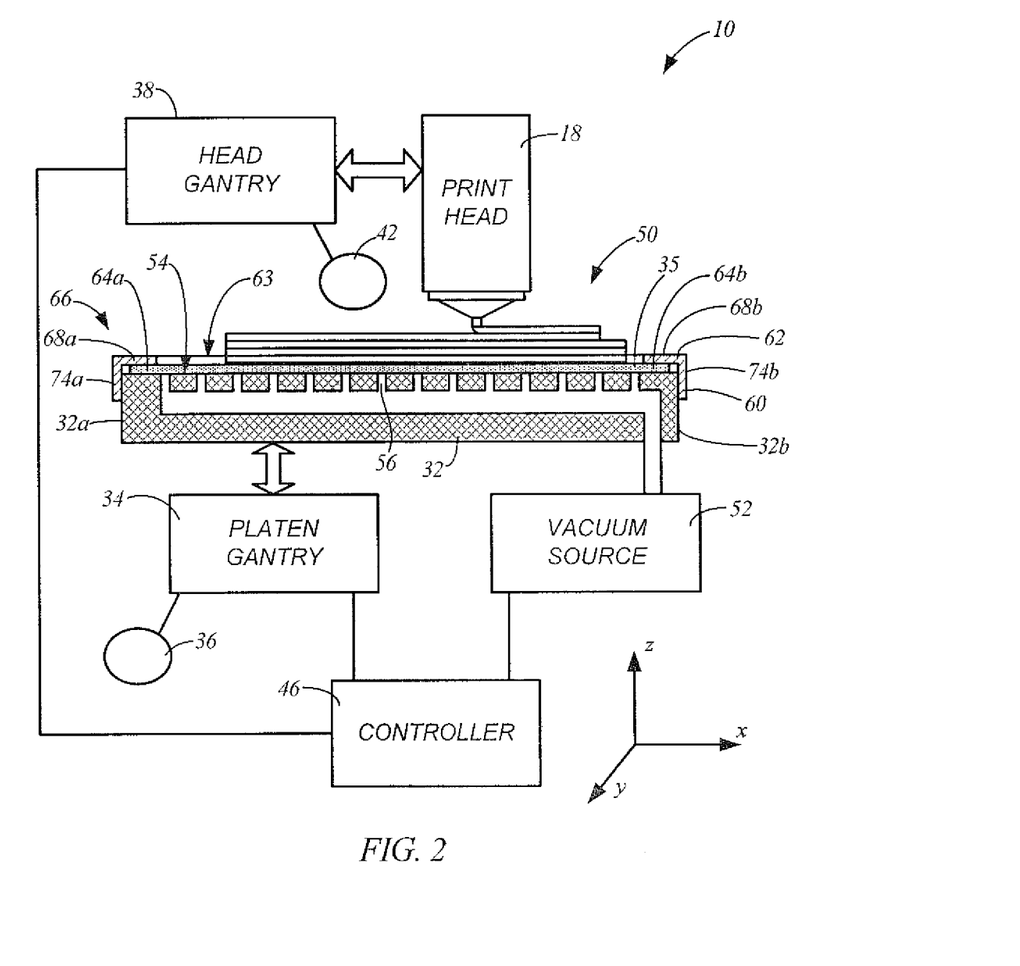
FIG. 2 is a simplified diagram of portions of the extrusion-based additive manufacturing system of FIG. 1 with a platen and other components shown in cross-section, in accordance with exemplary embodiments of the present disclosure.

System 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn. under the trademarks "FDM" and "Fortus". As shown, system 10 includes a system housing 26, two material bays 28, a chamber 30, and a vacuum platen 32. System 10 also includes a platen gantry 34 driven by a z-axis motor 36, and a head gantry 38 driven by one or more x-y motors 42, as shown in FIG. 2, which is a simplified diagram of portions of the extrusion-based additive manufacturing system 10 with vacuum platen 32 and other components shown in cross-section.

System housing 26 is a structural component of system 10 and may include multiple structural sub-components such as support frames, housing walls, and the like. In the shown embodiment, system housing 26 defines the dimensions of bays 28, and of chamber 30. Bays 28 are container bays configured to respectively receive container portions 14 of extrusion assemblies 12.

In an alternative embodiment, bays 28 may be omitted to reduce the overall footprint of system 10. In this embodiment, container portions 14 may stand adjacent to system housing 26, while providing sufficient ranges of movement for guide tubes 16 and print heads 18. Bays 28, however, provide convenient locations for loading consumable materials.

Chamber 30 is an enclosed environment that contains vacuum platen 32 for printing 3D part 22 and support structure 24. Chamber 30 may be heated (e.g., with circulating heated air) to reduce the rate at which the part and support materials solidify after being extruded and deposited (e.g., to reduce distortions and curling). In alternative embodiments, chamber 30 may be omitted and/or replaced with different types of build environments. For example, 3D part 22 and support structure 24 may be built in a build environment that is open to ambient conditions, or may be enclosed with alternative structures (e.g., flexible curtains).

Vacuum platen 32 is a platform on which 3D part 22 and support structure 24 are printed in a layer-by-layer manner, and is supported by platen gantry 34. Platen 32 may support and retain a disposable sheet substrate 35, on which 3D part 22 and support structure 24 are printed. In some embodiments, sheet substrate 35 is a flexible sheet formed of a polymeric material. An exemplary conventional sheet substrate 35 is in the form an acrylic sheet having a thickness of about 0.06. Platen gantry 34 is a gantry assembly configured to move platen 32 along (or substantially along) the z-axis and is powered by z-axis motor 36.

The print heads 18 are supported by head gantry 38, as shown in the exemplary embodiment. Other examples of suitable devices and techniques for retaining print heads 18 include those disclosed in Swanson et al., U.S. Pat. Nos. 8,403,658 and 8,647,102. In the shown exemplary embodiment, head gantry 38 is configured to move the print heads 18 in (or substantially in) a horizontal x-y plane above chamber 30, and is powered by x-y motors 42. Examples of other suitable gantry assemblies for head gantry 38 include those disclosed in Comb et al., U.S. Pat. No. 9,108,360.

In an alternative embodiment, platen 32 may be configured to move in the horizontal x-y plane within chamber 30, and print heads 18 may be configured to move along the z-axis. Other similar arrangements may also be used such that one or both of platen 32 and print heads 18 are moveable relative to each other. Platen 32 and print heads 18 may also be oriented along different axes. For example, platen 32 may be oriented vertically and print heads 18 may print 3D part 22 and support structure 24 along the x-axis or the y-axis.

System 10 also includes a controller 46, which represents one or more control circuits comprising one or more processors that are configured to monitor and operate the components of system 10 to perform one or more functions or method steps described herein. For example, one or more of the control functions performed by controller 46 can be implemented in hardware, software, firmware, and the like, or a combination thereof. Controller 46 may communicate over communication line 48 with print heads 18, chamber 30 (e.g., with a heating unit for chamber 30), motors 40 and 42, and various sensors, calibration devices, display devices, user input devices, and/or other components of the system 10. Controller 46 may also communicate with one or more of bays 28, platen 32, platen gantry 34, head gantry 38, and any other suitable component of system 10.

While illustrated as a single signal line, communication line 48 may include one or more electrical, optical, and/or wireless signal lines, allowing controller 46 to communicate with various components of system 10. Furthermore, while illustrated outside of system 10, controller 46 and communication line 48 may be internal components to system 10. System 10 and/or controller 46 may also communicate with one or more computer-based systems (not shown), which may include computer-based hardware, such as data storage devices, processors, memory modules, and the like for generating, storing, and transmitting tool path and related printing instructions to system 10.

During operation, controller 46 may direct z-axis motor 36 and platen gantry 34 to move platen 32 to a predetermined height within chamber 30. Controller 46 may then direct motors 42 and head gantry 38 to move print heads 18 around in the horizontal x-y plane above chamber 30. Controller 46 may also direct devices in print heads 18, to selectively draw successive segments of the consumable material from container portions 14.

Each print head 18 thermally melts the successive segments of the received consumable filament such that it becomes a molten material, thereby allowing the molten material to be extruded and deposited onto platen 32 for printing 3D part 22 and support structure 24 in a layer-by-layer manner. After the print operation is complete, the resulting 3D part 32 and support structure 24 may be removed from chamber 30, and support structure 24 may be removed from 3D part 22. 3D part 22 may then undergo one or more additional post-processing steps.

FIG. 2 also illustrates the printing of an exemplary 3D part 50 on sheet substrate 35, which is supported on vacuum platen 32, in accordance with embodiments of the present disclosure. In the shown embodiment, platen 32 is coupled to a vacuum source 52, which can be activated to create a vacuum in response to signals from controller 46. In some embodiments, surface 54 includes a plurality of holes 56 that expose sheet substrate 35 to the vacuum produced by vacuum source 52. The vacuum assists in securing sheet substrate 35 to support surface 54 of platen 32 during printing or forming of the part 50 using the at least one print head 18. After printing is complete, controller 46 will signal the vacuum source 52 to deactivate the vacuum, thereby releasing the vacuum hold-down force on substrate 35.

At times, sheet substrate 35 may warp or curl as it is heated within chamber 30 (FIG. 1) of system 10. Even when vacuum source 52 is used, the curling or warpage of sheet substrate 35 may prevent sheet substrate 35 from becoming sufficiently retained to support surface 54 to perform a 3D part printing operation using the at least one print head 18. Some embodiments of the present disclosure are directed to a retention device 60 that operates to retain sheet substrate 35 on support surface 54 of platen 32 with the use of a vacuum source 52. In some embodiments, the vacuum source 52 may be eliminated, particularly when thick sheet substrates 35 are used.

The use of retention device 60 to secure sheet substrate 35 on support surface 54, allows for the use of sheet substrates 35 that are much thinner than conventional sheet substrates that have a thickness of about 0.06 inches, as mentioned above. In some embodiments, sheet substrate 35 is formed of a polymeric material and has a thickness of less than approximately 0.007 inches, such as about 0.005 to about 0.007 inches, for example.

Figure 3:
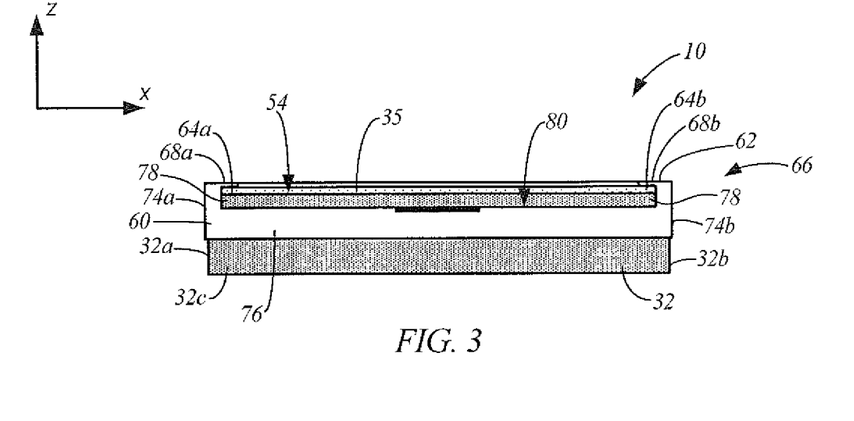
FIG. 3 is a simplified front view of a portion of the exemplary additive manufacturing system, in accordance with embodiments of the present disclosure.
Figure 4:
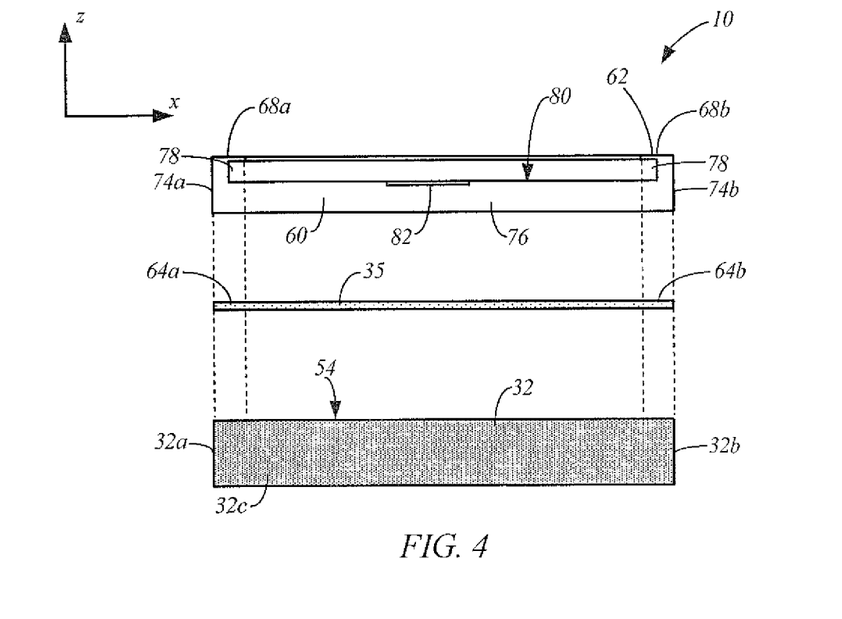
FIG. 4 is an exploded front view of the portion of the system illustrated in FIG. 3.
Figure 5:
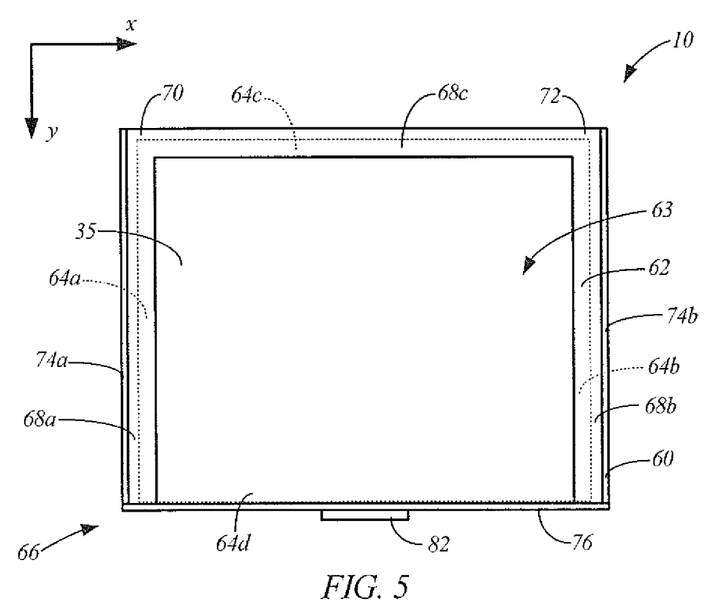
FIG. 5 is a top plan view of the portion of the system shown in FIG. 3, in accordance with embodiments of the present disclosure.
Figure 6:
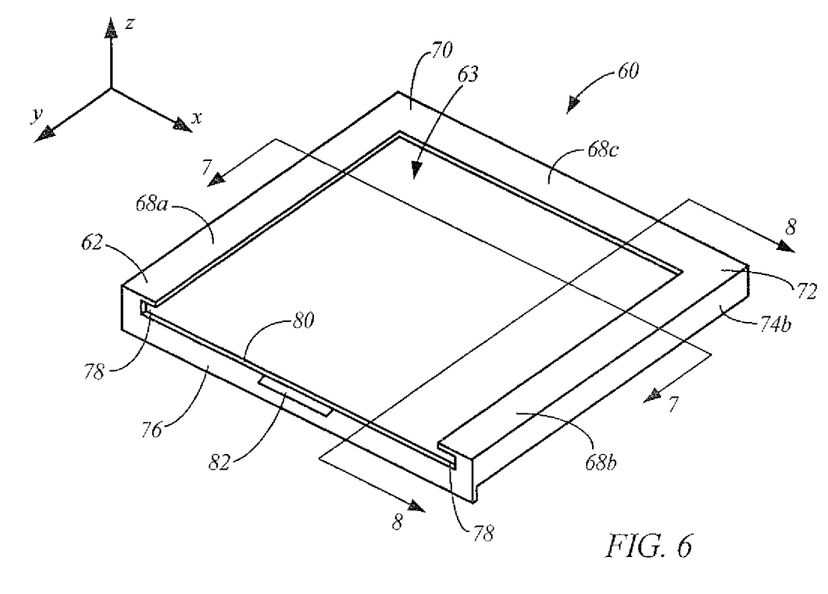
FIG. 6 is an isometric view of an exemplary retention device, formed in accordance with embodiments of the present disclosure.
Figure 7:
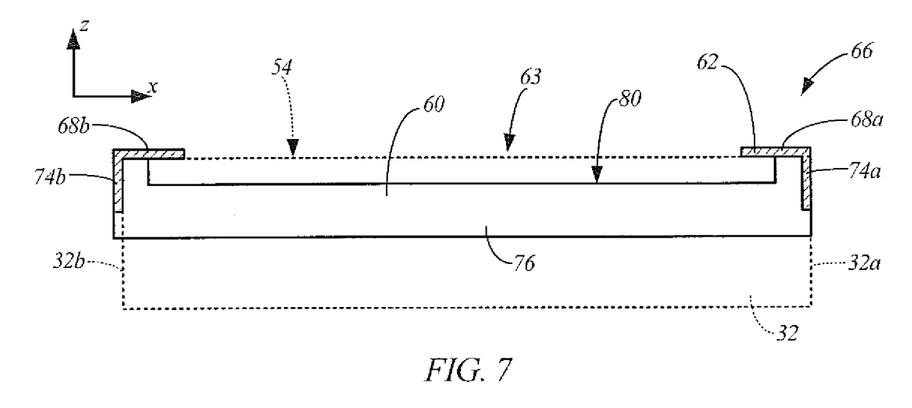
FIGS. 7 and 8 are cross-sectional views of the retention device of FIG. 6 taken generally along lines 7-7 and 8-8, respectively, in accordance with embodiments of the present disclosure.
Figure 8:
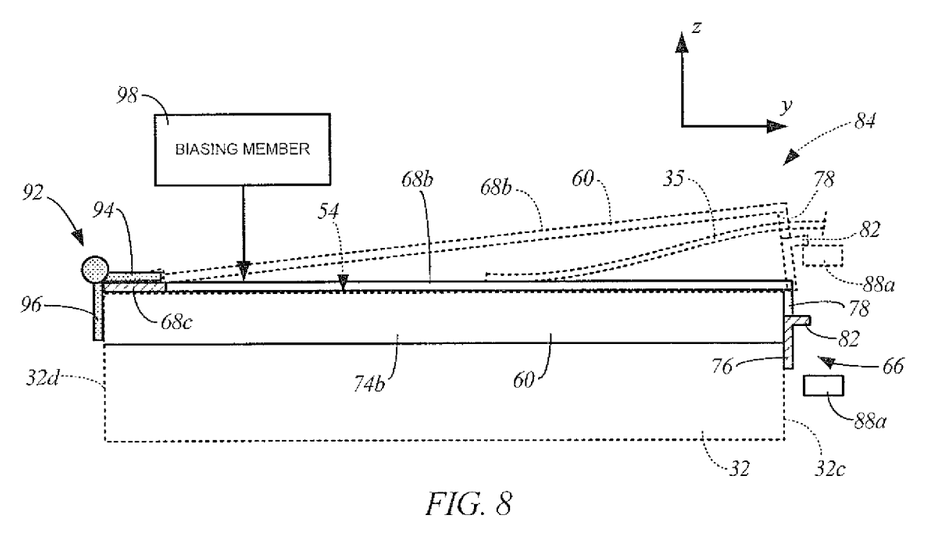

Exemplary embodiments of retention device 60 are illustrated in FIGS. 3-8. FIG. 3 is a simplified front view of a portion of system 10 including an exemplary retention device 60 retaining sheet substrate 35 on support surface 64 of platen 32, in accordance with embodiments of the present disclosure. FIG. 4 is an exploded front view of the portion of system 10 illustrated in FIG. 3. FIG. 5 is a top plan view of the portion of system 10 shown in FIG. 3, in accordance with embodiments of the present disclosure. FIG. 6 is an isometric view of an exemplary retention device 60, formed in accordance with embodiments of the present disclosure. FIGS. 7 and 8 are cross-sectional views of retention device 60 of FIG. 6 taken generally along lines 7-7 and 8-8, respectively, with platen 32 illustrated in phantom lines.

In some embodiments, retention device 60 includes a frame 62 that defines an opening 63, through which the at least one print head 18 extrudes the part and/or support material to form the 3D part 50 on sheet substrate 35. In some embodiments, frame 62 is configured to press two or more edge portions of sheet substrate 35, generally referred to as edge portions 64, against support surface 54 of platen 32 when retention device 60 is in an operative position 66 relative to platen 32, as shown in FIGS. 2, 3 and 5. In some embodiments, the two or more edge portions 64 of sheet substrate 35 include a side edge portion 64a, a side edge portion 64b, a rear edge portion 64c, and/or a front edge portion 64d, as shown in FIG. 5. In some embodiments, the frame 62 is a planar structure that is substantially parallel to support surface 54 of platen 32. Frame 62 may also take on other forms as dictated by support surface 54.

In some embodiments, frame 62 includes one or more frame portions, generally referred to as 68, that press the two or more edge portions 64 of sheet substrate 35 against support surface 54 of platen 32 when retention device 60 is in the operative position 66. In some embodiments, frame 62 includes a frame portion 68a that is configured to press side edge portion 64a of sheet substrate 35 against support surface 54 of platen 32, a frame portion 68b that is configured to press side edge portion 64b against support surface 54 of platen 32, and/or a frame portion 68c that is configured to press rear edge portion 64c of sheet substrate 35 against support surface 54 of platen 32, when retention device 60 is in the operative position 66 relative to platen 32. In some embodiments, frame 62 may also include a frame portion (not shown) that is configured to press front edge portion 64d of sheet substrate 35 against support surface 54 of platen 32 when retention device 60 is in operative position 66. In some embodiments, frame portion 68a extends orthogonally from frame portion 68c at end 70 of frame portion 68c, and frame portion 68b extends orthogonally from frame portion 68c at end 72, as shown in FIG. 5.

In some embodiments, retention device 60 includes a pair of side walls 74a and 74b, which are shown in FIGS. 2, 5 and 7. In some embodiments, side wall 74a generally extends orthogonally from frame portion 68a, and side wall 74b generally extends orthogonally from frame portion 68b, as shown in FIGS. 2 and 7. In some embodiments, side walls 74a and 74b extend along opposing sides 32a and 32b of platen 32 when retention device 60 is in the operative position 66, as shown in FIG. 2.

In some embodiments, retention device 60 includes a front wall 76 that extends between frame portions 68a and 68b, as shown in FIG. 6. In some embodiments, front wall 76 extends along a front side 32c of platen 32, as shown in FIGS. 3 and 8. In some embodiments, front wall 76 extends below support surface 54 when retention device 60 is in the operative position 66, as illustrated in solid lines in FIG. 8. As used herein, the terms "below" and "above" refer to relative positions along the z-axis (vertical axis). Thus, as shown in FIG. 8, at least a portion of front wall 76 extends below or to a lower position along the z-axis than that of support surface 54 when retention device 60 is in the operative position 66.

In some embodiments, retention device 60 includes a slot 78 (FIGS. 3, 4, 6 and 8) that extends between a top surface 80 of front wall 76 and frame portions 68a and 68b. In some embodiments, slot 78 is configured to receive sheet substrate 35 when retention device 60 is in a receiving position relative to platen 32, as discussed in greater detail below.

In some embodiments, retention device 60 includes a tab 82 that extends from front wall 76, as shown in FIGS. 5, 6, and 8. In some embodiments, tab 82 extends away from opening 63, as shown in FIG. 5.

In some embodiments, retention device 60 is formed of a single sheet of metal, such as stainless steel, or other suitable material. Retention device 60 is then formed from the sheet of material by performing various cuts and bends.

In some embodiments, retention device 60 includes a raised state or position 84, in which retention device 60, or portions thereof, are raised above support surface 54 (i.e., higher vertical or z-axis position). This allows for the insertion of sheet substrate 35 onto support surface 54 of platen 32. In some embodiments, top surface 80 of front wall 76 is positioned at or above support surface 54 (i.e., higher position along z-axis), when retention device 60 is in the raised position 84, as shown in phantom lines in FIG. 8. This allows for the insertion of sheet substrate 35 through slot 78, as illustrated in phantom lines in FIG. 8.

In some embodiments, retention device 60 is moved between the raised and lowered positions 84 and 66 by an operator of system 10. In some embodiments, retention device 60 is moved from the lowered position 66 to the raised position 84 automatically in response to lowering platen 32 past a certain position along the vertical or z-axis using the platen gantry 34. Exemplary embodiments for transitioning retention device 60 between the lowered position 66 and the raised position 84 will be described with reference to FIGS. 9-12, which illustrate front views of the portion of system 10 illustrated in FIG. 3 during various stages of moving retention device 60 between the lowered position 66 and the raised position 84.

In some embodiments, system 10 includes at least one stop member, generally referred to as 88, within chamber 30 (FIG. 1) that is configured to engage retention device 60 and drive movement of retention device 60 between the lowered position 66 and the raised position 84 in response to movement of platen 32 by gantry 34. In some embodiments, at least one stop member 88 is positioned adjacent the platen 32, such as alongside sides 32a-d of platen 32. In some exemplary embodiments, the at least one stop member includes a stop member 88a (FIGS. 8 and 9) that is configured to engage a portion of retention device 60 that is adjacent the front side 32c of platen 32, a stop member 88b (FIG. 9) that is positioned to engage a portion of retention device 60 that is adjacent the side 32a of platen 32, and/or a stop member 88 on side 32b.

Figure 9:
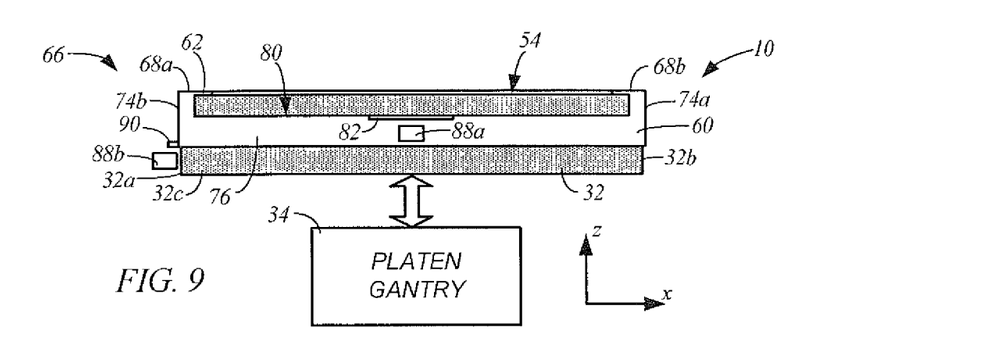
FIGS. 9-12 are simplified front views of the portion of the system illustrated in FIG. 3 during various stages of moving a retention device between a lowered position and a raised position, in accordance with embodiments of the present disclosure.

When platen 32 is raised above an engagement position along the vertical or z-axis, at which the one or more stop members 88 engage portions of retention device 60, retention device 60 is in the lowered position 66, as shown in FIG. 9. Here, the at least one stop member 88, such as stop members 88a or 88b, does not engage portions of retention device 60.

Figure 10:
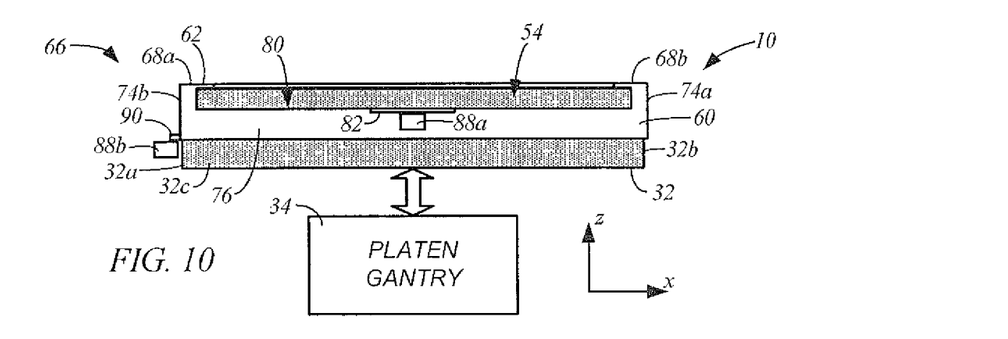

When gantry 34 lowers platen 32 to the engagement position, the at least one stop member 88 engages a portion of retention device 60, as shown in FIG. 10. In some embodiments, retention device 60 includes a portion, such as a tab, that protrudes along the x-axis and/or the y-axis to engage the at least one stop member 88 when platen 32 is in the engagement position along the vertical or z-axis. For example, when system 10 includes stop member 88a, a portion of retention device 60, such as tab 82 engages stop member 88a when platen 32 is lowered to the engagement position, as shown in FIG. 10. When system 10 includes stop member 88b, a portion of retention device 60, such as tab 90 engages stop member 88b when platen 32 is lowered to the engagement position, as shown in FIG. 10.

Figure 11:
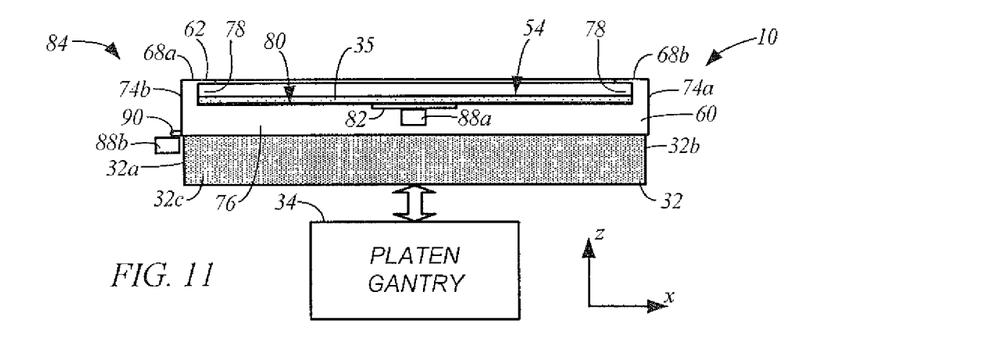

As gantry 34 continues to lower platen 32 along the vertical or z-axis below the engagement position (FIG. 10), retention device 60 is moved to the raised position 84, as shown in FIG. 11. This allows for the insertion of sheet substrate 35 through, for example, slot 78 of retention device 60, and onto support surface 54 of platen 32, as indicated in FIGS. 8 and 11.

In some embodiments, when retention device 60 is in the raised position 84, portions of frame 62 are displaced from support surface 54 a greater distance than when retention device 60 is in the lowered position 66. In some exemplary embodiments illustrated in FIG. 8, at least the portions of frame portions 68a and 68b that are adjacent front wall 76 are raised above (i.e., have a higher position along the vertical or z-axis) support surface 54, when retention device 60 is in the raised position 84 (shown in phantom lines) than when retention device 60 is in the lowered position 66 (shown in solid lines). This allows an operator of system 10 to, for example, insert sheet substrate 35 under frame 62, or through slot 78 of retention device 60, and onto support surface 54 of platen 32, as indicated in phantom lines in FIG. 8.

Figure 12:
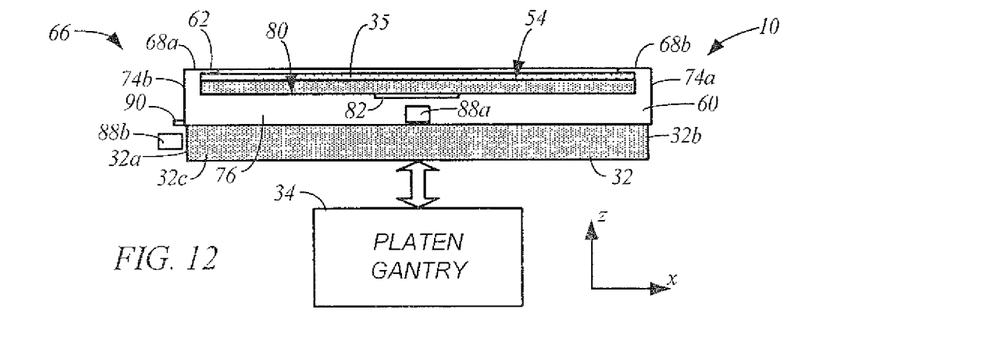

In some embodiments, after positioning sheet substrate 35 on support surface 54 of platen 32, gantry 34 raises platen 32 along the vertical or z-axis to at least the engagement position, which causes retention device 60 to return to the lowered position 66, as shown in FIG. 12. When in the lowered position 66, retention device 60 secures or retains sheet substrate 35 on support surface 54 of platen 32.

In some embodiments, system 10 includes a hinge 92 that couples retention device 60 to platen 32, as shown in FIG. 8. In some embodiments, hinge 92 allows retention device 60 to pivot between the lowered position 66 and the raised position 84, and maintains retention device 60 in a desired orientation relative to platen 32 when retention device 60 is in the lowered position 66. In some embodiments, hinge 92 includes an arm 94 attached to frame 62, or other portion of retention device 60, and an arm 96 attached to platen 32, or other suitable location. The arm 94 is configured to pivot about an axis that is generally parallel to the x-axis relative to arm 96, as retention device 60 moves between the lowered and raised positions 66 and 84.

In some embodiments, system 10 includes a biasing member 98 that is configured to bias retention device 60 in the lowered position 66, as shown in FIG. 8. In some embodiments, biasing member 98 applies a force to retention device 60 that drives retention device 60 toward the lowered position 66. Biasing member 98 also maintains engagement between the at least one stop member 88 and the corresponding portion of retention device 60 when platen 32 is located at or below the engagement position (FIGS. 10 and 11). Exemplary embodiments of the biasing member 98 include a spring, a weight, or other suitable biasing member. The biasing member biases the retention device 60 toward support surface 54.

Figure 13:
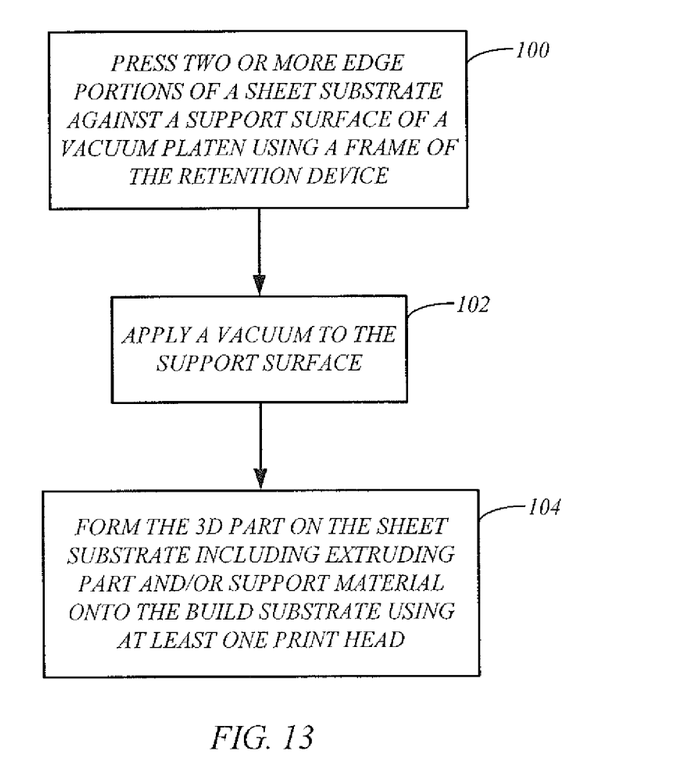
FIG. 13 is a flowchart illustrating a method of operating an additive manufacturing system, in accordance with embodiments of the present disclosure.

Additional embodiments of the present disclosure are directed to a method of operating the additive manufacturing system 10 formed in accordance with one or more embodiments described herein. FIG. 13 is a flowchart illustrating steps of the method in accordance with exemplary embodiments of the present disclosure. In some embodiments of the method, at step 100, a sheet substrate 35 is retained on a support surface 54 of a platen 32 using a retention device 60 formed in accordance with one or more embodiments of the present disclosure. In some embodiments of this retaining step, two or more edge portions 64 of the sheet substrate 35 are pressed against the support surface 54 using a frame 62 of the retention device 60, such as shown in FIGS. 2, 3 and 5, for example.

At 102 of the method, a vacuum is applied to the support surface 54. In some embodiments of step 102, the vacuum source 52 (FIG. 2) is activated.

At 104 of the method, a 3D part 50 is formed on the sheet substrate 35 by extruding part and/or support material onto sheet substrate 35 using at least one print head 18, as shown in FIG. 2. In some embodiments, the part and/or support material is extruded through an opening 63 of retention device 60 defined by frame 62.

Figure 14:
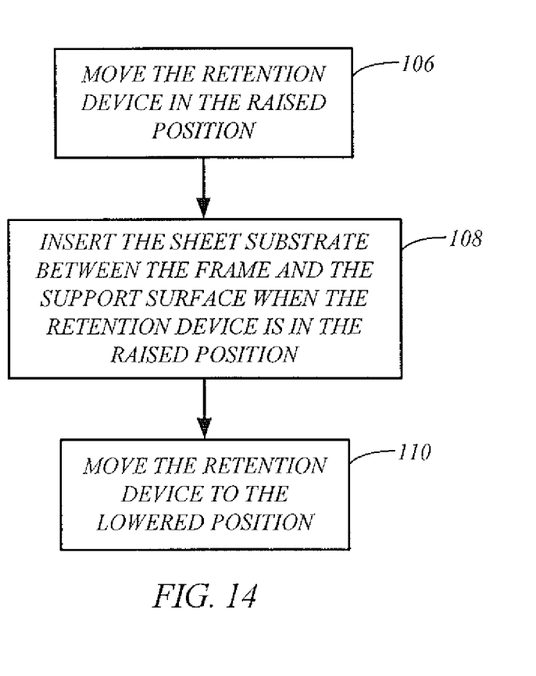
FIG. 14 is a flowchart illustrating embodiments of a method of retaining a sheet substrate on a support surface of a vacuum platen, in accordance with embodiments of the present disclosure.

FIG. 14 is a flowchart illustrating embodiments of the method step 100, in which the sheet substrate 35 is retained on the support surface 54 of vacuum platen 32. At 106 of the method, the retention device 60 is moved to the raised position 84 relative to the support surface 54, as shown in FIGS. 8 and 11. At 108, the sheet substrate 35 is inserted between the frame 62 and support surface 54, such as through slot 78, when retention device 60 is in the raised position 84 relative to support surface 54 or platen 32, as illustrated in FIGS. 8 and 11. At 110 of the method, retention device 60 is moved to the lowered position 66 relative to the support surface 54 using either the gantry 34 or gravity, in which frame 62 presses the two or more edge portions 64 of sheet substrate 35 against support surface 54, as shown in FIGS. 2, 3 and 5. This secures or retains sheet substrate 35 against support surface 54, and completes step 100 of the method (FIG. 13). A 3D part 50 may then be printed or formed on sheet substrate 35 (step 104) after the vacuum is applied (step 102) using the one or more print heads 18, as illustrated in FIG. 2.

In some embodiments, movement of retention device 60 between the raised position 84 and the lowered position 66 is facilitated by moving platen 32 along the vertical or z-axis using gantry 34, as described above with regard to FIGS. 9-12. In some embodiments of method step 106, platen 32 is initially lowered from the position illustrated in FIG. 9 to a position along the vertical or z-axis that is below an engagement position (FIG. 10), as shown in FIG. 11. In some embodiments, a stop member 88, such as stop member 88a and/or 88b, engages retention device 60 and causes portions of retention device 60 to be raised above support surface 54 during this lowering of platen 32 to position retention device 60 in the raised position 84, as shown in FIGS. 8 and 11. In some embodiments, when retention device 60 is in the raised position 84, portions of frame 62, such as portions of frame portions 68a and 68b, are displaced from support surface 54 a greater distance than when retention device 60 is in the lowered position 66. Alternatively, manual force can be used to move the retention device 60 to the raised position 84.

After inserting sheet substrate 35 between frame 62 and support surface 54, such as through slot 78, as indicated in FIGS. 8 and 11 to complete step 108 of the method. Platen 32 is then raised along the vertical or z-axis above the engagement position (FIG. 10) using platen gantry 34 until retention device 60 disengages from the at least one stop member 88, to place retention device 60 in the lowered position 66, as shown in FIGS. 2, 3, 8 and 12 and complete step 110 of the method. Alternatively, the retention device 60 is lowered using manual force or gravity.

In some embodiments, retention device 60 is coupled to platen 32 through hinge 92, as shown in FIG. 8. Thus, movement of the retention device between the raised position 84 and the lowered position 66 involves pivoting frame 62 relative to platen 32 using hinge 92.

Although the present disclosure has been described with reference to preferred embodiments, workers skilled in the art will recognize that changes may be made in form and detail without departing from the spirit and scope of the disclosure.

The invention claimed is:

1. An extrusion-based additive manufacturing system for forming 3D parts comprising:
   a vacuum platen;
   a gantry configured to move the platen along a vertical axis;
   at least one print head configured to extrude part and/or support material onto a support surface of the platen; and
   a retention device including a frame configured to press two or more edge portions of a disposable sheet substrate against the support surface of the platen when the retention device is in a lowered position relative to the platen, the retention device comprising:
      a first frame portion having first and second opposing ends;
      a second frame portion extending substantially orthogonally from the first end;
      a third frame portion extending substantially orthogonally from the second end;
      a front wall extending between the second and third frame portions, wherein the front wall is configured to extend along a front side of the platen and below the support surface when the retention device is in the lowered position; and
      spaced apart slots extending between a top surface of the front wall and the second and third frame portions, the spaced apart slots being configured to receive the sheet substrate when the retention device is in a receiving position relative to the platen, in which the top surface of the front wall is above the support surface of the platen.

2. The system according to claim 1, wherein the retention device includes a tab extending from the front wall.

3. The system according to claim 1, wherein the retention device includes a pair of side walls, one of the side walls extending substantially orthogonally from the second frame portion, and one of the side walls extending substantially orthogonally from the third frame portion.

4. The system according to claim 3, wherein the sidewalls extend along opposing sides of the platen when the retention device is in the lowered position.

5. The system according to claim 3, wherein the frame, the front wall and the side walls are formed from a single sheet of metal.

6. The system according to claim 1, wherein the print head is configured to extrude the part and/or support material through an opening of the retention device defined by the frame and onto the sheet substrate.

7. The system according to claim 1, wherein the system further comprises:
   at least one stop member;
   the retention device configured to engage the at least one stop member when the gantry positions the platen in an engagement position along the vertical axis;
   the retention device is configured to be disengaged from the at least one stop member and placed in the lowered position when the gantry positions the platen above the engagement position; and
   the retention device is configured to be moved to a raised position when the gantry positions the platen below the engagement position, when the retention device is in the raised position, portions of the frame are displaced from the support surface a greater distance than when the retention device is in the lowered position.

8. The system according to claim 7, further comprising a hinge coupling the retention device to the platen.

9. The system according to claim 8, wherein the retention device comprises a biasing member configured to bias the retention device toward the lowered position.

10. A method of forming a 3D part using an extrusion-based additive manufacturing system, the method comprising:
    retaining a sheet substrate on a support surface of a vacuum platen using a retention device, the retention device comprising:
       a first frame portion having first and second opposing ends;
       a second frame portion extending substantially orthogonally from the first end;
       a third frame portion extending substantially orthogonally from the second end;
       a front wall extending between the second and third frame portions, wherein the front wall is configured to extend along a front side of the platen and below the support surface when the retention device is in the lowered position; and
       spaced apart slots extending between a top surface of the front wall and the second and third frame portions, the spaced apart slots being configured to receive the sheet substrate when the retention device is in a receiving position relative to the platen, in which the top surface of the front wall is above the support surface of the platen;
    applying a vacuum to the support surface; and
    forming the 3D part on the sheet substrate including extruding part and/or support material onto the sheet substrate using at least one print head.

11. The method of claim 10, wherein retaining the built substrate to the support surface comprises:
    inserting the sheet substrate through the spaced apart slots of the retention device and between the frame and the support surface when the retention device is in a raised position relative to the support surface; and
    moving the retention device to a lowered position using a gantry, in which the frame presses the two or more edge portions of the sheet substrate against the support surface.

12. The method of claim 11, wherein applying a vacuum comprises activating a vacuum source.

13. The method according to claim 12, wherein moving the retention device to the lowered position comprises:
    positioning the platen below an engagement position along a vertical axis to place the retention device in the raised position, in which a stop member engages the retention device and portions of the frame are displaced from the support surface a greater distance than when the retention device is in the lowered position;
    raising the platen along the vertical axis above the engagement position, in which the retention device is disengaged from the stop member to place the retention device in the lowered position.

14. The method according to claim 13, wherein the retention device is coupled to the platen through a hinge, and moving the retention device to the lowered position comprises pivoting the frame relative to the platen using the hinge.

15. The method according to claim 10, wherein extruding part and/or support material onto the sheet substrate comprises extruding the part and/or support material through an opening of the retention device defined by the frame.

16. An extrusion-based additive manufacturing system for forming 3D parts comprising:
   a vacuum platen;
   a gantry configured to move the platen along a vertical axis;
   at least one print head configured to extrude part and/or support material onto a support surface of the platen;
   a retention device including a frame configured to press two or more edge portions of a disposable sheet substrate against the support surface of the platen when the retention device is in a lowered position relative to the platen; and
   at least one stop member;
   the retention device configured to engage the at least one stop member when the gantry positions the platen in an engagement position along the vertical axis;
   the retention device is configured to be disengaged from the at least one stop member and placed in the lowered position when the gantry positions the platen above the engagement position; and
   the retention device is configured to be moved to a raised position when the gantry positions the platen below the engagement position, when the retention device is in the raised position, portions of the frame are displaced from the support surface a greater distance than when the retention device is in the lowered position.

17. The system according to claim 16, wherein the retention device comprises:
   a first frame portion having first and second opposing ends;
   a second frame portion extending substantially orthogonally from the first end;
   a third frame portion extending substantially orthogonally from the second end;
   a front wall extending between the second and third frame portions, wherein the front wall is configured to extend along a front side of the platen and below the support surface when the retention device is in the lowered position; and
   spaced apart slots extending between a top surface of the front wall and the second and third frame portions, the spaced apart slots being configured to receive the sheet substrate when the retention device is in a receiving position relative to the platen, in which the top surface of the front wall is above the support surface of the platen.

18. The system according to claim 17, wherein the retention device includes a tab extending from the front wall.

19. The system according to claim 16, further comprising a hinge coupling the retention device to the platen.

20. The system according to claim 16, wherein the retention device comprises a biasing member configured to bias the retention device toward the lowered position.

* * * * *